US009710800B2

(12) United States Patent
Yopp et al.

(10) Patent No.: US 9,710,800 B2
(45) Date of Patent: Jul. 18, 2017

(54) USING VOICE INPUT AT A MOBILE POINT OF SALE

(71) Applicant: Oracle International Corporation, Redwood Shores, CA (US)

(72) Inventors: John E. Yopp, Minneapolis, MN (US); Charles T. Pilon, Saint Paul, MN (US); David L. Dorf, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 63 days.

(21) Appl. No.: 13/886,747

(22) Filed: May 3, 2013

(65) Prior Publication Data

US 2014/0330659 A1 Nov. 6, 2014

(51) Int. Cl.
*G06Q 20/20* (2012.01)
*G06Q 20/32* (2012.01)

(52) U.S. Cl.
CPC ......... *G06Q 20/202* (2013.01); *G06Q 20/322* (2013.01)

(58) Field of Classification Search
CPC .... G06Q 20/0855; G06Q 20/20; G06Q 30/06; G07G 1/0081
USPC .................. 705/21, 16, 39, 37, 80; 235/379
See application file for complete search history.

(56) References Cited

U.S. PATENT DOCUMENTS 7,796,045 B2 * 9/2010 Spear et al. ............... 340/573.1
8,744,414 B2 * 6/2014 Roundtree ........ H04M 3/42178 455/414.1
2004/0139318 A1 * 7/2004 Fiala et al. .................... 713/165
2006/0165066 A1 * 7/2006 Campbell et al. ............ 370/352
2007/0007331 A1 * 1/2007 Jasper .................... G06Q 20/20 235/379
2007/0206734 A1 * 9/2007 Hagale et al. ............... 379/67.1
2007/0240046 A1 * 10/2007 Yan et al. ..................... 715/700
2008/0222004 A1 * 9/2008 Pollock et al. ................. 705/26
2009/0189162 A1 * 7/2009 Kim ............................... 257/72
2011/0035294 A1 * 2/2011 Mizrah ...................... 705/26.42
2011/0251906 A1 * 10/2011 Loevenguth et al. .......... 705/16
2012/0136957 A1 * 5/2012 Bellamy et al. .............. 709/208
2012/0158589 A1 * 6/2012 Katzin ................... G06Q 20/12 705/44
2013/0138517 A1 * 5/2013 Khan .................... G06Q 30/00 705/16
2013/0297496 A1 * 11/2013 Cloran ............ G06Q 10/06311 705/39
2014/0100976 A1 * 4/2014 Aldomar et al. ............... 705/21
(Continued)

*Primary Examiner* — Vanel Frenel

(57) ABSTRACT

A method, system, and computer-readable storage medium for using voice input at a mobile point-of-sale (POS) are disclosed. For example, one method involves receiving a voice input, where the receiving is performed by a mobile POS (MPOS) device. The method also involves determining, based on the voice input, whether to use voice-based processing. In response to a determination to use the voice-based processing, performing voice-based processing, including selecting a first workflow based on the voice input, and performing a first portion of the first workflow based on the voice input. The first portion of the first workflow is performed by the MPOS device. The method also includes determining whether to perform a second portion of the first workflow based on another voice input.

20 Claims, 13 Drawing Sheets

Server
506(1)
522(1)
Audio
524
Text
526
POS Server
504
518
520
500
Commands
528
Indications / Instructions
530
Server
506(2)
522(2)
Text
532
Audio
534
Network
508
Mobile Device
502
510
512
514
516
ID Audio
536
ID Token
538
Server
506(3)
522(3)

(56) References Cited

U.S. PATENT DOCUMENTS

2014/0310183 A1* 10/2014 Weber ................ G06Q 20/3829 705/71
2015/0269869 A1* 9/2015 Russell ............ G06Q 10/06398 434/156

* cited by examiner

200
Start
Voice input available? 202
N
Y
Process voice input 204
Use voice input? 206
N
Y
Select and perform workflow using voice input 208
Select and perform workflow using manual controls 210
Perform another workflow? 212
N
Y
Select another workflow 214
End

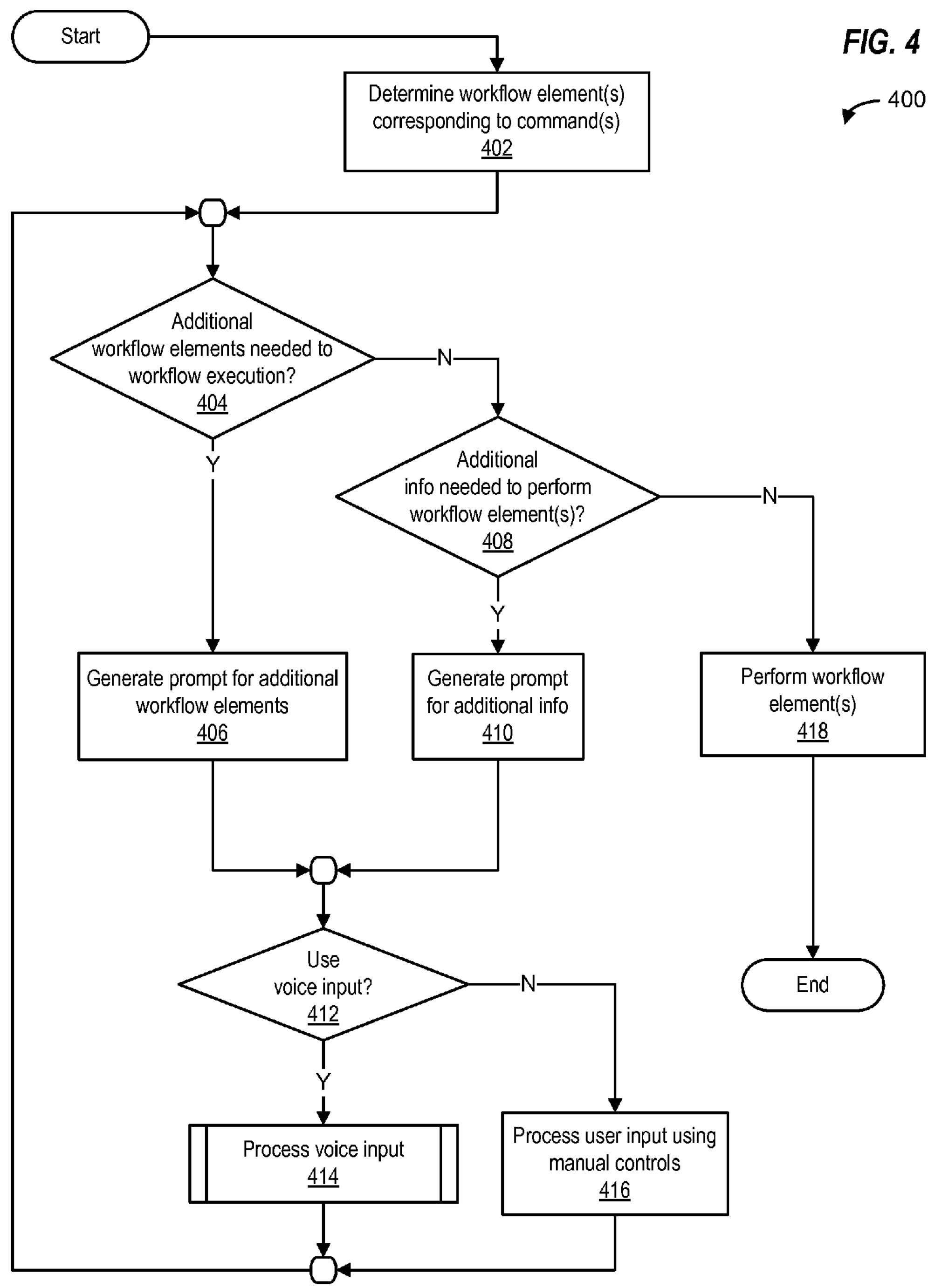

FIG. 4
400
Start
Determine workflow element(s) corresponding to command(s) 402
Additional workflow elements needed to workflow execution? 404
N
Y
Additional info needed to perform workflow element(s)? 408
N
Y
Generate prompt for additional workflow elements 406
Generate prompt for additional info 410
Perform workflow element(s) 418
Use voice input? 412
N
Y
End
Process voice input 414
Process user input using manual controls 416

500
POS Server
504
518
520
Indications / Instructions
530
Commands
528
Mobile Device
502
510
512
514
516
Network
508
ID Token
538
ID Audio
536
Server
506(3)
522(3)
Audio
524
Text
526
Text
532
Audio
534
Server
506(1)
522(1)
Server
506(2)
522(2)

Start
6A
Acquire voice input
602
Process voice input
604
Is voice input recognizable?
606
N
Y
Provide alternatives?
608
N
Y
Provide alternatives
610
Receive user selection
612
Reacquire voice input?
614
N
Y
Continue with acquiring voice input?
616
N
Y
Voice input validated?
618
N
Y
6A
Error handler
620
End

600

Start
Item scan
802

800
Scan
recognized?
804
Y
N
Numerical entry
806
Entry
recognized?
808
N
Y
Process scan
810
Attempt
to rescan?
812
N
Y
End Start 900
Receive selection of item row
902
Receive selection of modify item element
904
Receive selection of discount element
906
Receive selection of discount amount
908
Receive selection of discount reason
910
Entry recognized?
912
N
Y
Receive selection of confirmation
914
Process discount
916
End

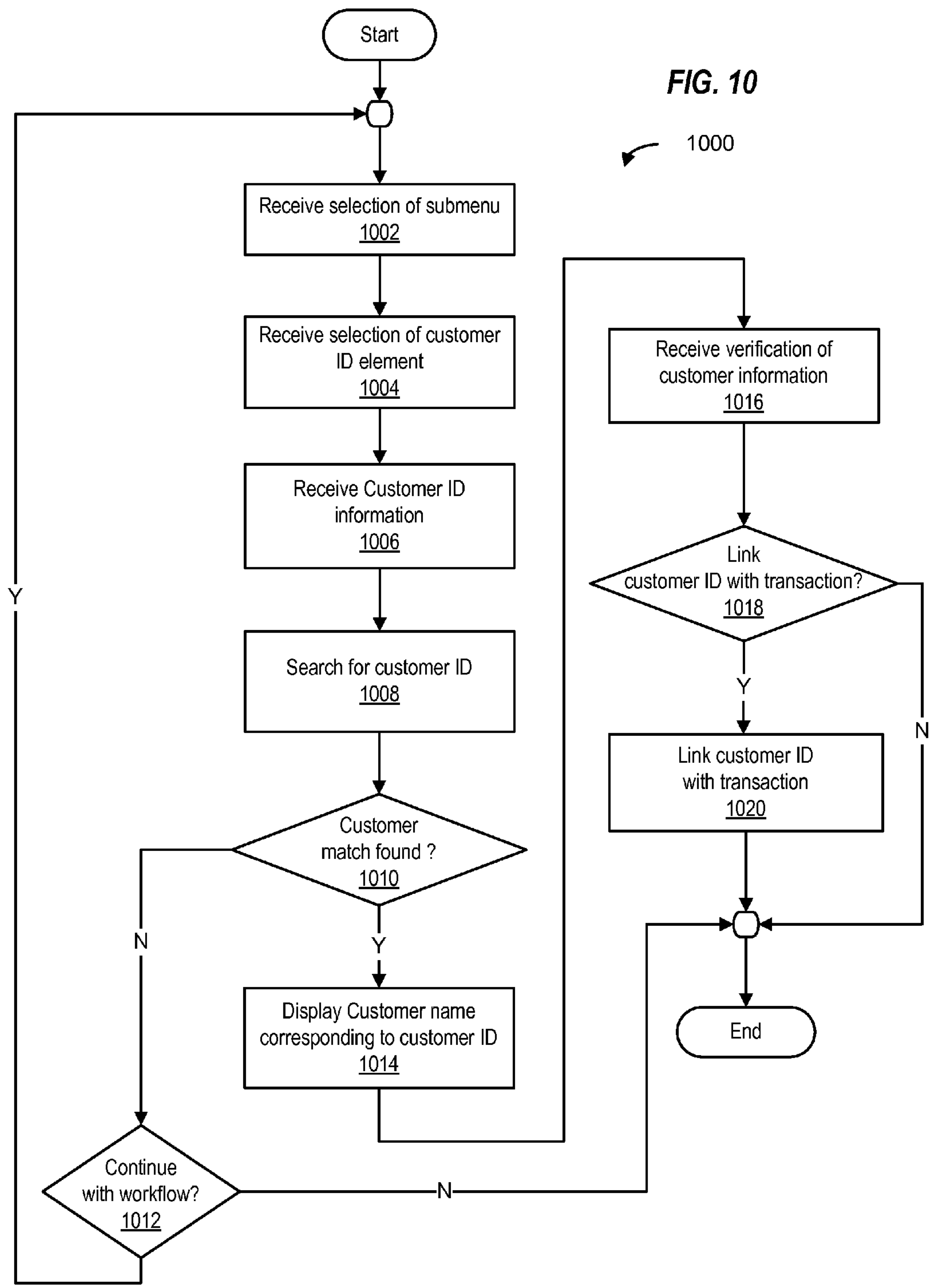
Start
FIG. 10
1000
Receive selection of submenu
1002
Receive selection of customer ID element
1004
Receive Customer ID information
1006
Search for customer ID
1008
Customer match found ?
1010
Y
N
Display Customer name corresponding to customer ID
1014
Continue with workflow?
1012
Y
N
Receive verification of customer information
1016
Link customer ID with transaction?
1018
Y
N
Link customer ID with transaction
1020
End

USING VOICE INPUT AT A MOBILE POINT OF SALE

BACKGROUND OF THE INVENTION

Field of the Invention

This application relates to a point-of-sale. Particularly, this application relates to receiving and processing of voice input at a point-of-sale.

Description of the Related Art

A Point of Sale (POS) is the place where a retail transaction between a customer and a merchant is completed. At the POS, traditionally, a clerk uses a cash register, or a comparable POS device, to allow the customer to make a payment to the merchant in exchange for goods and/or services. At the POS, the clerk uses such devices to, for example, calculate the amount owed by the customer for the goods and/or services in question. The merchant also will provide options as to the form of payment used by the customer to pay for the goods and/or services. Once the payment is completed, a receipt for the transaction is issued. POS devices can provide this register functionality, as well as additional item, inventory, or customer functionality, such as the ability to track and record customer orders, manage inventory, and so on.

Mobile POS (MPOS) devices, which are un-tethered from the cashier lanes, are useful for retailers who desire more personalized customer interaction, such as with regard to lifestyle and fashion brands, or who need to be able to reduce long customer wait times, that can occur in various situations, such as during peak hours or holidays. These MPOS devices provide fast scanning of items and can take most forms of payment. Under normal circumstances, they work quickly and efficiently. However, when item bar codes are difficult to scan, or when a transaction requires special processing (e.g., when attempting to apply an employee discount), the operator needs to do more than simply scan or press a couple of buttons. Various sales processes can be invoked by the MPOS devices to guide the clerk through a series of steps, such as by displaying a series of screens and menu options for the clerk to complete. On many mobile devices that have a touch screen, or even a dedicated hardware keyboard, using the MPOS device's manual controls to enter lengthy information or navigating through a chain of screens can become tedious, slow, and error prone.

SUMMARY OF THE INVENTION

Various systems and methods for using a distributed computing system are disclosed. For example, one method involves receiving a voice input, where the receiving is performed by a mobile POS (MPOS) device. The method also involves determining, based on the voice input, whether to use voice-based processing. In response to a determination to use the voice-based processing, performing voice-based processing, including selecting a first workflow based on the voice input, and performing a first portion of the first workflow based on the voice input. The first portion of the first workflow is performed by the MPOS device. The method also includes determining whether to perform a second portion of the first workflow based on another voice input.

BRIEF DESCRIPTION OF THE DRAWINGS

The present invention may be better understood, and its numerous objects, features, and advantages made apparent to those skilled in the art by referencing the accompanying drawings.

FIG. 4 is a flowchart of a method for performing a part of a workflow, according to one embodiment.

FIG. 10 is a flowchart of a workflow for customer ID, according to one embodiment.

Figure 1:
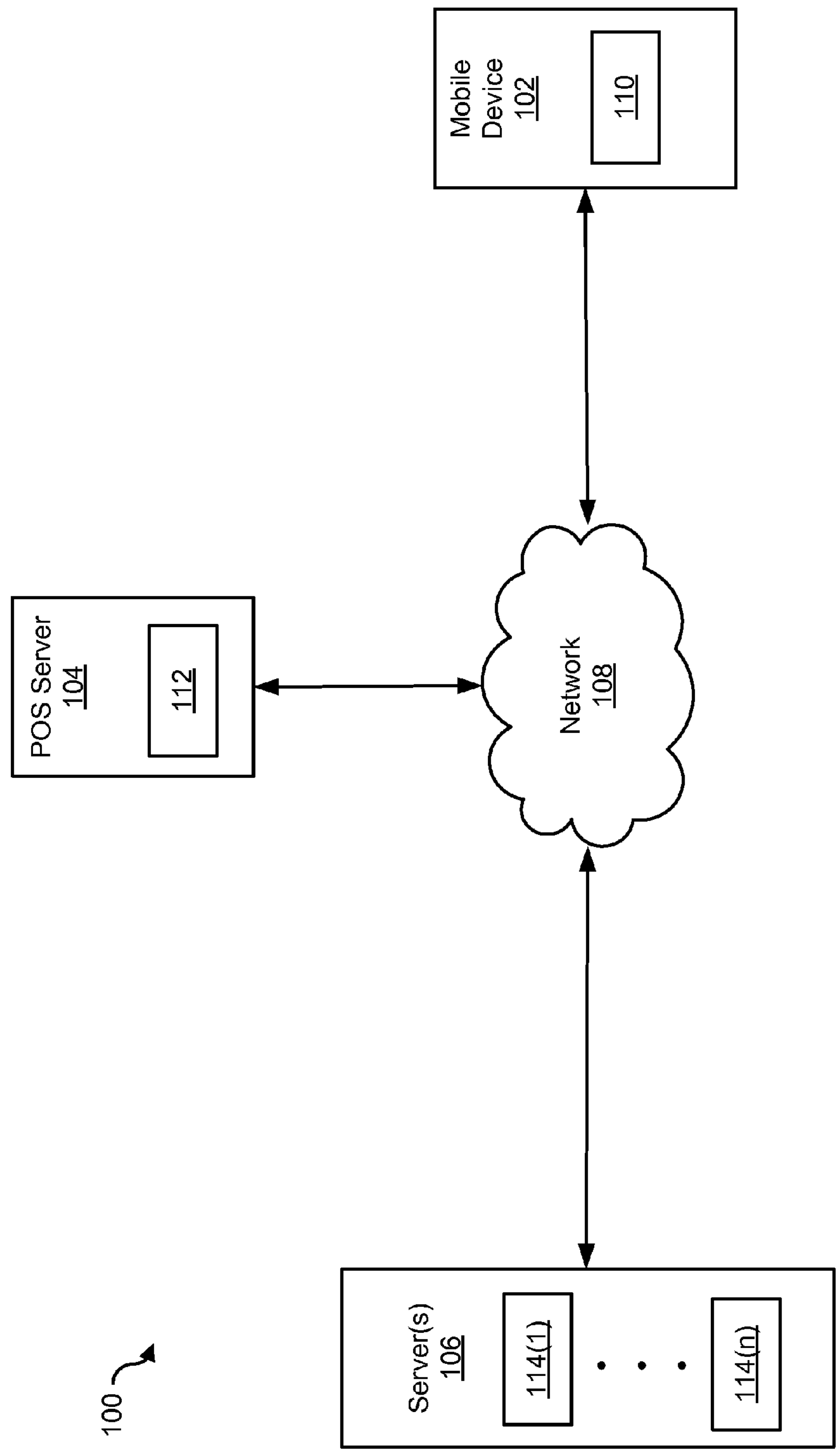
FIG. 1 is a block diagram illustrating a system that includes a mobile Point of Sale (POS) device, a POS server, and various servers, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Although the present invention is subsequently described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Introduction

Workflows can be used by the MPOS devices to guide the clerk through a series of steps, such as by displaying a series of screens and menu options for the clerk to complete, to be performed in completing a sale. Workflows also indicate to the MPOS device when to access business logic (that can be located on another device), such as to access item inventory, or to process payments. Mobile POS devices described herein can alleviate the issues associated using workflows, such as of entering lengthy information, or of navigating through a chain of screens. In one implementation, these issues can be handled, to a certain extent, through software flow design. For example, the flow and entry fields of workflow elements can be optimized through more efficient workflow design. However, even efficient workflows can still suffer inefficiencies resulting from, e.g., issues related to user input/output (e.g., when stepping through elements of these workflows).

Mobile POS devices described herein alleviate some of these issues. The MPOS device described herein uses voice input to allow users to interact with POS applications, as though speaking to another clerk, for example. Thus, the use of voice interaction frees the user from the constraints of static navigation through workflows. Furthermore, manual entry on a mobile device is typically accomplished using a small, virtual keyboard, often while typing with a single finger and holding the mobile device in the other hand, which can easily result in errors. Voice interaction minimizes the possibility of such errors.

Such a mobile POS device allows the user to use voice as an alternate entry medium, e.g., by allowing the user to speak commands. These commands are acquired and processed by the MPOS device via the voice interface, thus avoiding the entry of lengthy numbers, selection of and/or navigation through various selection screens. In general, by using voice input, the user of the MPOS device can bypass one or more workflow elements, thereby improving efficiency in the sales process. The MPOS device can also provide prompts for the clerk to use. These prompts, generated using text-to-voice conversion, can include provide the clerk with prompts such as customer relationship script details (e.g., "tools are 15% off this week for registered carpenters like yourself"). The MPOS device can also include voiceprint identification of clerks or customers, which can be used to identify a customer right on the retail shop floor.

Example Architecture

FIG. 1 is a block diagram illustrating an example of a point-of-sale (POS) system 100 that includes a collection of devices and servers. POS system 100 includes a mobile POS (MPOS) device 102, a POS server 104, and one or more servers 106, which can communicate with each other using a network 108. Mobile POS device 102 includes a control module 110 that (along with one or more supporting modules) acquires and processes voice input, provides graphical user interface (GUI) interaction, and communicates with business logic. POS server 104 includes a business logic module 112 that communicates commands and/or other data with other devices and/or servers on network 108, including MPOS device 102. Server(s) 106 includes various modules 114(1)-114(*n*) that receive various data from MPOS device 102 and/or from POS server 104, process this data, and return various results. Detailed use of this POS system is described below with reference to FIGS. 2-13 below.

In general, a store clerk (or other sales personnel) uses MPOS device 102 to provide POS functionality to a customer, including scanning items, looking up related items for sale, and/or to performing retail transactions. MPOS device 102 allows the clerk to execute various workflows in order to assist with various POS transactions. For example, one workflow assists the clerk with using MPOS device 102 to manually enter item identification, in the process of checking that item's price and/or availability (e.g., in a different size, color, or at a different store). Another workflow assists the clerk with using MPOS device 102 to enter a customer's name, password, and/or other credentials, such as when accessing that customer's personalized account. Example workflows are illustrated in FIGS. 8-11.

A clerk can start a workflow by scanning an item (i.e., by accessing an item's scan tag) using MPOS device 102. If the scan is not recognized by MPOS device 102 (if the item's scan tag is defective), then MPOS device 102 can determine whether a voice input is received, e.g., from the clerk. If MPOS device 102 receives voice input, and if the voice input is recognizable, then MPOS device 102 processes this voice input. Based on the results of this voice input processing, MPOS device 102 selects which workflow to perform, and also which element(s) of this selected workflow to execute. For example, if the selected workflow has ten elements, and the voice input is received while a second element of this workflow is being executed by MPOS device 102, results of the processing of the voice input can be used instead of executing subsequent workflow elements. By using the results of the voice input processing, MPOS 104 device can skip execution of several, or all, of the remaining eight elements of this workflow. For example, if the voice input received from the clerk is processed to correctly identify and verify the item, then MPOS device 102 determines that all but the last workflow element have been performed by using the voice input. Once the voice input is processed, then MPOS device 102 executes the last element of the workflow, which can include, for example, displaying the item's price and/or availability on MPOS device 102.

After the execution of this workflow is finished, MPOS device 102 can execute another workflow, which can provide prompts to the store clerk. For example, this other workflow can provide real-time voice prompts to the clerk by way of a headset (coupled to MPOS device 102). These voice prompts can include offers or sales related to the recent purchase by that customer, and are meant to provide a script to the clerk, for use in conversing with the customer.

MPOS device 102 is configured to communicate with POS server 104, such as to communicate data, commands, and/or results of various processing steps. POS server 104 includes business logic module 112 that includes information regarding workflows, as well as logic to choose which workflow(s) to execute. In one embodiment, at least part of the functionality of this business logic module is implemented by MPOS device 102. MPOS device 102 can be implemented on a number of platforms, including a mobile phone (such as a smart phone or a feature phone), a tablet, a portable music player, a portable gaming system, a laptop computer, a smart watch, or any other portable device (e.g., that can be carried and/or held by a store clerk), having a processor and memory, and configured to store and execute at least portions of software implementing the operations illustrated by FIGS. 2-4, 6, 7, and workflows of FIG. 8-11.

Server(s) 106 can receive and process data from MPOS device 102 and POS server 104, for example. Server(s) 106 can receive audio (e.g., audio acquired from MPOS device 102), perform voice-to-text translation, and transmit text (that corresponds to the received audio) back to MPOS device 102 and/or POS server 104. Similarly, server(s) 106 can receive text (e.g., a text file that corresponds to a prompt from MPOS device 102 or POS server 104), perform text-to-speech translation, and transmit audio (that corresponds to the spoken information for the received prompt) back to MPOS device 102 and/or POS server 104.

Example Processes

Figure 2:
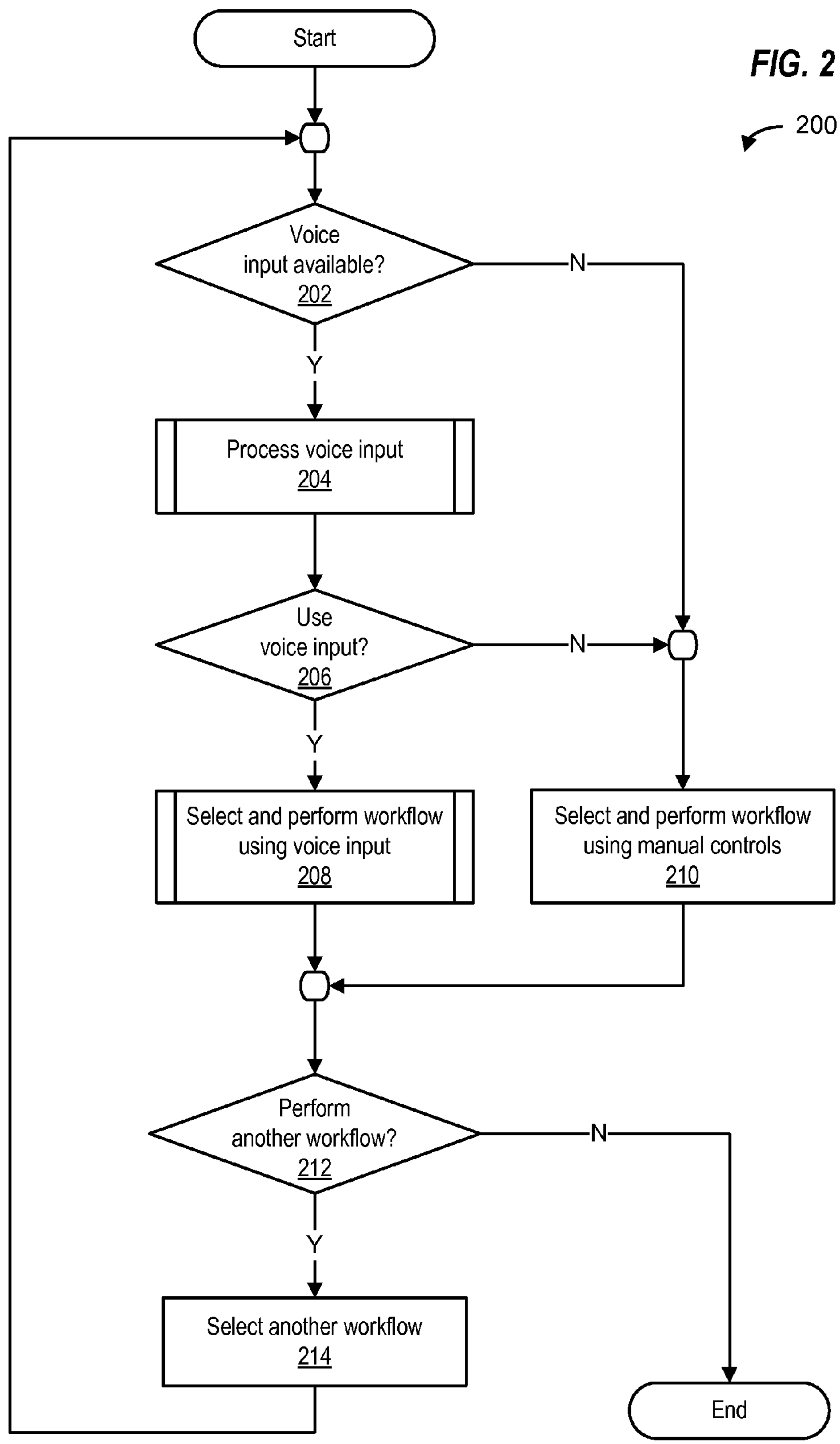
FIG. 2 is a flowchart of a method of using a mobile POS (MPOS) device, according to one embodiment.

FIG. 2 is a flowchart illustrating a method 200 for using a distributed computing system, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1. In one embodiment, method 200 is implemented by control module 110.

It is noted that the methods of FIGS. 2-4, 6, and 7, described below, illustrate various embodiments of using voice input at a mobile POS device. As will be appreciated in light of the present disclosure, these methods may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in other embodiments.

FIG. 2 illustrates a method 200 of using a mobile POS device, according to certain embodiments. Method 200 is described with reference to the elements described in connection with FIG. 1, and variations thereof. In one embodiment, at least portions of method 200 are executed by an MPOS device, such as by control module 110 of MPOS device 102 of FIG. 1.

In step 202, the MPOS device determines whether voice input is available. The MPOS device makes this determination, for example, based on whether voice input is received.

In one embodiment, the MPOS device is activated prior to executing step 202. For example, the store clerk can activate the MPOS device, such as by pressing a button on the MPOS's display or keyboard, or by scanning an item. In one implementation, the clerk activates the MPOS device by speaking to it, and thus providing the voice input. If the MPOS device determines that the voice input is available, step 204 is performed. If the MPOS device determines no voice input is available, step 210 is performed. It is noted, as described with reference to FIGS. 3 and 4, that the MPOS device can receive, process, and use voice input at various points during execution of a workflow.

In step 204, the MPOS device processes a voice input, such as received from a store clerk or a store customer. Step 202 includes determining whether the voice input is recognizable, whether it corresponds to actual commands, and also whether the clerk has validated this voice input. Step 204 is described in more detail with reference to FIG. 6.

In step 206, the MPOS device determines whether to use the voice input. The MPOS device makes this determination, for example, on whether the voice input (received in step 204) was successfully processed (e.g., whether one or more commands were recognized in the voice input). If the MPOS device determines that the voice input will be used, step 208 is performed. If the MPOS device determines that the voice input will not be used, step 210 is performed.

In step 208, the MPOS device selects and performs a workflow based on the voice input. For example, during a checkout process (between a customer and a clerk) when a purchasing an item, the MPOS device can select a workflow that corresponds to a clerk entering a specific discount type for that item. As described in more detail with reference to FIGS. 3 and 4, the MPOS device also selects certain element(s) of a workflow corresponding to the commands specified by the voice input. The MPOS device then executes the selected workflow element(s). In other words, the MPOS device can base the execution of all, or a portion of, the selected workflow based on the voice input.

In one embodiment, the MPOS device communicates one or more of the command(s) to the POS server. Based on the command(s) received, the POS server's business logic module can determine which workflow to execute, including which element(s) of the workflow are to be executed next. In one implementation, if the workflow is not stored at the MPOS, the POS server can provide instructions corresponding to the selected workflow and/or workflow elements. In another implementation, if the workflow is stored at the MPOS, the POS server sends indication(s) regarding the selected workflow and/or specific elements of that workflow to execute. In yet another implementation, the MPOS device transmits the received voice input to the POS server, which then processes the voice input (including voice-to-text translation and command parsing), and sends the results of such processing (and instructions, as appropriate) to the MPOS device.

In step 210, the MPOS device allows the clerk to select the workflow and perform its operations using manual controls. Similar to the example given above, during a checkout process (between a customer and a clerk) for a purchase of an item, the MPOS device can be used to select a workflow that allows a clerk to enter a specific discount type for that item. However, instead of using voice input, the MPOS device provides any prompts needed (as directed by the workflow) to the clerk, and receives input (such as input through the MPOS device's touch screen and/or keyboard, referred to as using manual controls) corresponding to these prompts. In other words, the MPOS device would step through the selected workflow. It is noted that, in one embodiment, during execution of the selected workflow, the MPOS device can receive voice input and then switch to the use of voice input, rather than using the MPOS's manual controls.

In step 212, the MPOS device determines whether another workflow is to be executed. The MPOS device can make this determination, for example, based on results of executing of the (previous) workflow, as executed in steps 208 or 210, possibly in combination with one or more user inputs. For example, if during execution of the previous workflow, a customer ID was received, then the MPOS device can determine that a workflow for generating a customer prompt (such as to indicate a special discount for this customer) is to be executed. In step 214, the MPOS device provides for the selection of another workflow to be generated. In one implementation, the MPOS device communicates with the POS server (e.g., to access the business logic portion of the POS server), and receives indication(s) regarding the next workflow.

Figure 3:
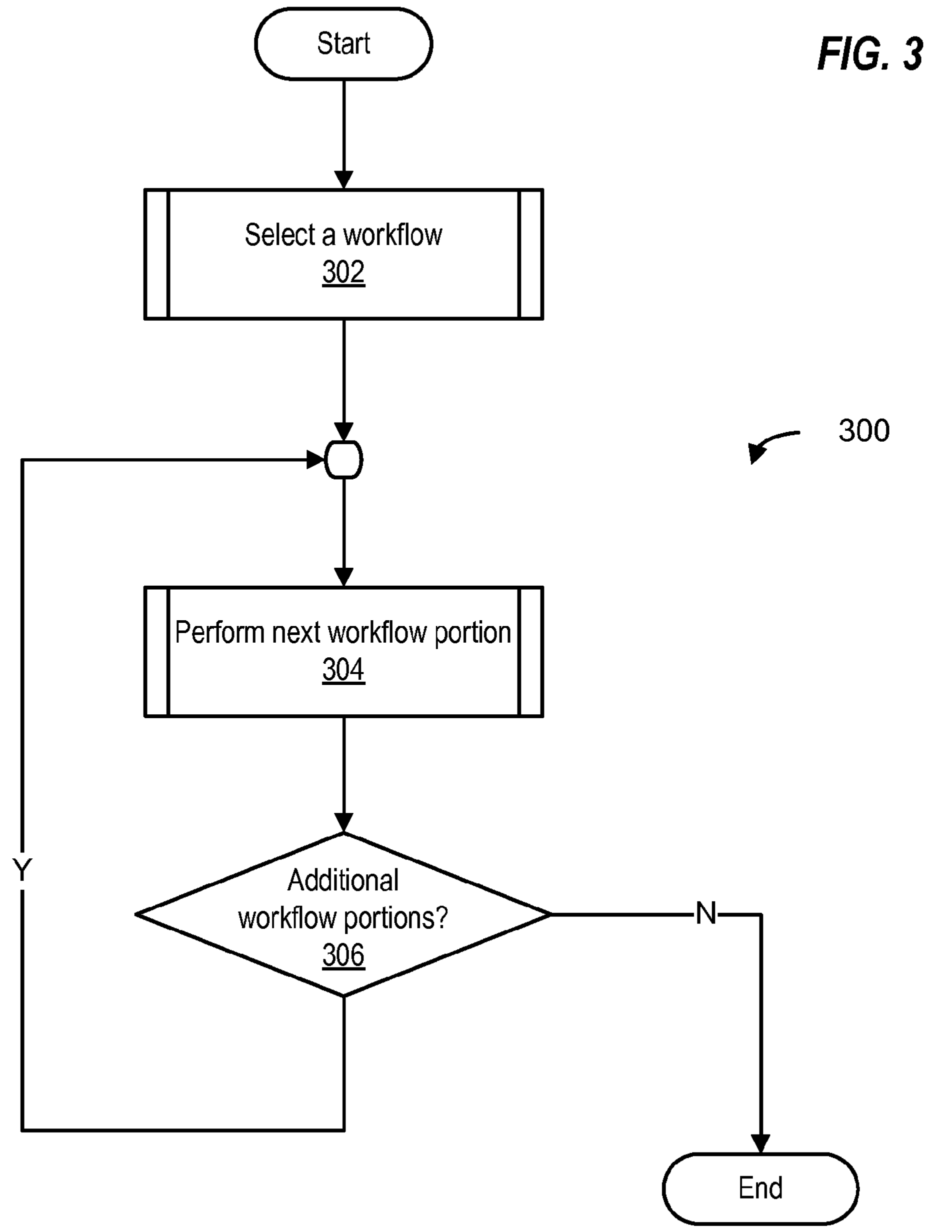
FIG. 3 is a flowchart of a method for selecting and performing a workflow based on voice input, according to one embodiment.

FIG. 3 illustrates a method 300 for selecting and performing a workflow based on voice input, according to certain embodiments. Method 300 is described with reference to variations of the elements described in connection with FIG. 1. In one embodiment, at least portions of method 300 are executed by the MPOS device of FIG. 1, such as by control module 110 of MPOS device 102. Method 300 thus implements step 208 of method 200.

In step 302, the MPOS device selects a workflow, such as one based on the receipt of one or more commands and/or on a workflow that is already selected. The MPOS device can obtain the command(s) from the processed voice input, and/or from manual input, such as using the MPOS device's touch screen, for example. It is noted that the MPOS device can select (and even begin execution of) a workflow prior to step 302 being performed. Such a pre-selected workflow can be selected based on a previous input received from the clerk, for example. For example, if a store clerk scans an item using the MPOS device (such as by scanning an item's tag using the MPOS device), then the MPOS device can select a certain workflow (such as that depicted in FIG. 8) corresponding to the scanning action. Based on the commands from the received voice input, the MPOS device can select this workflow, or a different workflow, to execute. In one embodiment, the MPOS device communicates with the POS server (e.g., the business logic module) to determine which workflow to execute, based on the command(s) and, if applicable, a workflow that has already been selected (e.g., such as that resulting from a prior user action).

In step 304, the next operation of the workflow is performed, as selected by step 302. As described in detail with reference to FIG. 4, during execution of step 304, the MPOS device determines which element(s) of the workflow correspond to the commands, and if the commands include the necessary information to execute the selected workflow element(s). The commands can be provided in the received voice input. The MPOS device can also make this determination based on indications/instructions received from a business logic module (e.g., as received from the POS server). Depending on the workflow element(s), the MPOS device and/or the POS server executes the selected workflow element(s). For example, a workflow element can include the POS server accessing an inventory database to determine availability of an item. The item's availability is then communicated to the MPOS device.

In step 306, the MPOS device determines whether there are any additional workflow operations to execute. In one example, one or more operations of the selected workflow remain to be executed in completing the selected workflow. Further, the received voice input in this example does not specify which of the selected workflow operations remain. In another example, the additional workflow operations can only be completed by the POS server, such as those based on the already-executed workflow operation(s). For example, the selected workflow can include other operations that are not addressed by the commands, and those operations are performed after the selected workflow operations are completed. If the MPOS device determines there is at least one additional workflow operation to be executed, step 304 is performed next. If the MPOS device determines that there are no more additional workflow operations, process of FIG. 3 concludes.

FIG. 4 illustrates a method 400 for selecting a workflow based on voice input, according to some embodiments. Method 400 is described with reference to variations of the elements described in connection with FIG. 1. In one embodiment, at least portions of method 400 are executed by the MPOS device of FIG. 1, such as by control module 110 of MPOS device 102. Method 400 thus implements step 304 of method 300.

In step 402, the MPOS device determines one or more workflow steps that correspond to the received commands. For example, the commands can indicate three workflow steps to be executed (of the workflow that is selected by step 302). The commands can be provided by the voice input and/or by business logic. In one embodiment, the MPOS device communicates the command(s) to the POS server. Based on the command(s), the POS server's business logic module determines which element(s) of the selected workflow are to be executed. If information regarding the workflow is not stored at the MPOS, the POS server can also send executable instructions corresponding to the selected workflow elements. In another implementation, if the information regarding the workflow is stored at the MPOS, the POS server just sends indication(s) regarding the selected elements of that workflow.

In step 404, the MPOS device determines whether additional workflow elements are needed for workflow execution. If there are additional workflow elements needed to execute, step 406 is performed. The MPOS device can determine, for example, that there are additional workflow elements to execute, if a certain workflow element is needed before the three workflow elements can be performed (as indicated by step 402). With reference to the example workflow depicted in FIG. 10, if the commands corresponding to workflow steps 1002-1006 and 1010 are present, but step 1008 is missing, then the MPOS device would determine that workflow step 1008 is needed. If there are no additional workflow elements needed to execute, step 408 is performed.

In step 406, the MPOS device generates a prompt for additional workflow elements. Continuing with the example above, the MPOS device would generate a prompt to obtain the amount of the discount.

In step 408, the MPOS device determines whether additional information is needed to perform the selected workflow elements. If there is additional information needed for the selected workflow elements to execute, step 410 is performed. The MPOS device can determine that there is additional information needed for execution, if, for example, one of the selected workflow elements needs additional information for execution. With reference to the workflow of FIG. 10, if the commands correspond to workflow steps 1002-1010, but an amount (or currency type) of step 1008 is missing, then the MPOS device would determine that this information is needed to properly execute workflow step 1008. If there is no additional information needed to perform the selected workflow elements, step 418 is performed, as described below.

In step 410, the MPOS device generates a prompt for additional information. Continuing with the example above, the MPOS device generates a prompt to obtain an amount, and/or other such information, such as a currency type for the amount of discount.

In step 412, the MPOS device determines whether to use the voice input. The MPOS device makes this determination, for example, based on whether voice input is received. If the MPOS device determines that the voice input is to be used, step 414 is performed. If the MPOS device determines that the voice input is not to be used, step 416 is performed, as described below.

In step 414, the MPOS device processes the voice input, such as to receive additional information or command(s) for a missing workflow element. In step 416, the MPOS processes user input using manual controls.

In step 418, the MPOS device performs the workflow element(s). The MPOS device can, for example, process the amount and type of a discount for a certain item, such as depicted in the example workflow of FIG. 9.

Figure 5:
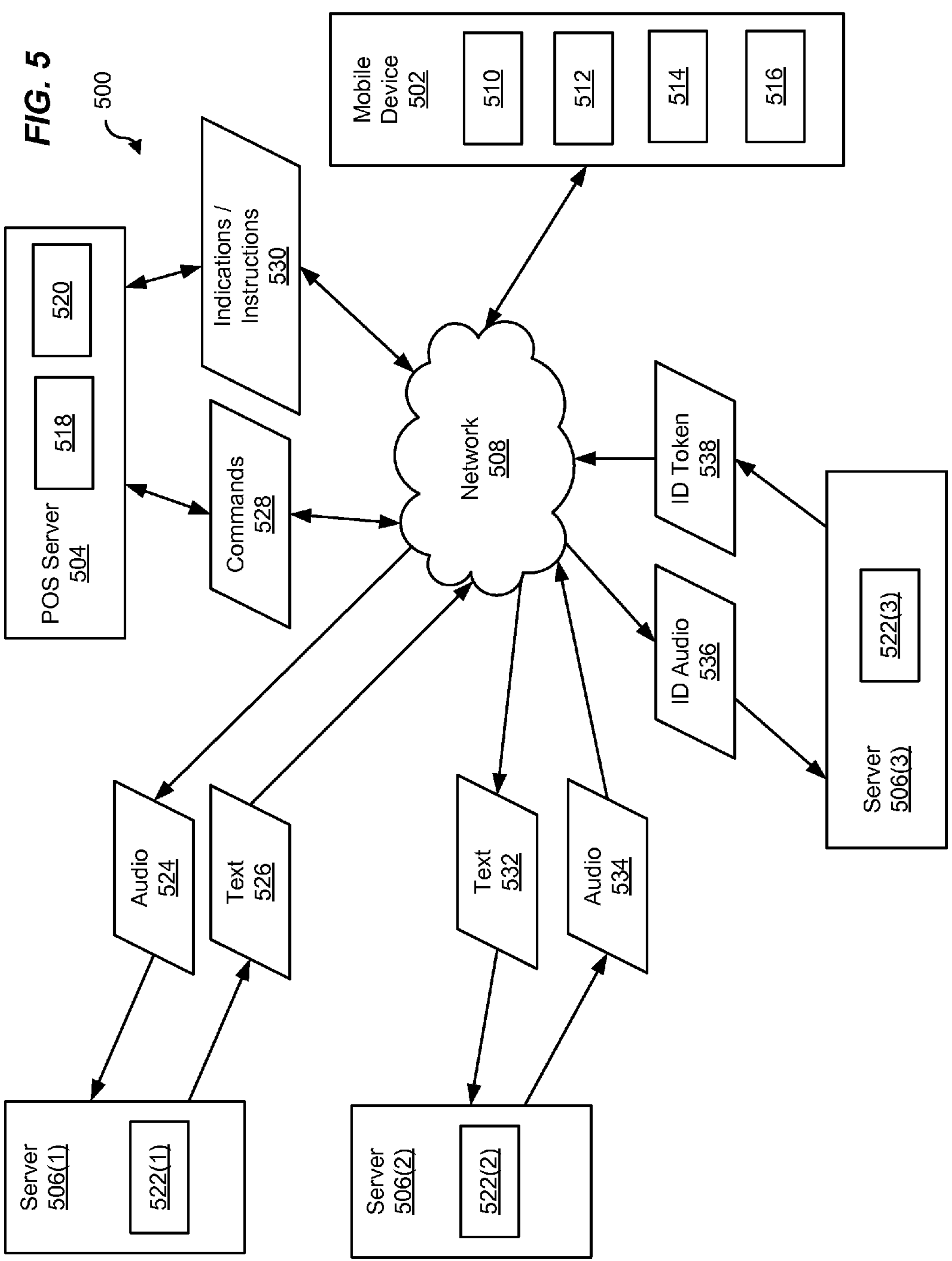
FIG. 5 is a detailed block diagram illustrating a system that includes a mobile Point of Sale (POS) device, a POS server, and various servers, according to one embodiment.

FIG. 5 is a block diagram illustrating another view of an example of a point-of-sale (POS) system 500 that includes a collection of devices and servers. POS system 500 can implement POS system 100 of FIG. 1. POS system 500 includes a mobile POS (MPOS) device 502, a POS server 504, and one or more servers 506(1)-506(3), which communicate with each other using a network 508. MPOS device 502 includes one or more modules 510-516. POS server 504 includes a business logic module 518 that determines which workflow and/or workflow elements to perform. POS server also includes a language module 520 that performs various text parsing and command generation functionality. POS server 504 communicates commands and/or other data with MPOS device 502 and/or servers 506 using network 508. Server(s) 506 includes various modules 522 that receive data from MPOS device 502 and/or from POS server 504, process this data, and return results.

MPOS device 502 includes modules which are configured to provide input/output (I/O) interaction capability with a store clerk, customers, and/or others. Audio module 510 is configured to capture audio (e.g., from the clerk and/or customers). Audio module 510 can acquire audio using an analog-to-digital converter, which converts audio to a digital form, such as an audio file, though other implementations are contemplated. Audio module 510 is also configured to generate audio prompts to the clerk, such as to indicate promotions (e.g., using a speaker, which can convert audio in digital form to analog signals).

Display module 512 is configured to display a Graphical User Interface (GUI); not shown. Such a GUI, in turn, can display various types of information to the clerk and/or customer. Display module 512 is also configured to provide information regarding, and accept, manual input from the clerk and/or customer, such as by way of a virtual keyboard, buttons, and/or other types of control that can be displayed on a display of MPOS device 502. Display module 512 can thus display a virtual keyboard, buttons, and/or other controls that allow a user to manually interact with such control(s) (such as via a touch screen, keyboard, or another input technique). Communication module 514 is configured to communicate with POS server 504 and servers 506, including communication of voice, text, commands, and/or results. Furthermore, communication module 514 is also configured to receive input from other devices, such as a barcode scanner, RFID scanner and/or any other type of a scanning device configured to determine an item's identification, such as on a retail shop floor where a transaction is taking place.

MPOS device 502 also includes control module 516 that is configured to process data from audio module 510, display module 512, and/or communication module 514. Control module 516 is also configured to perform at least portions of workflows such as described herein. As also described below, modules 510-516 can be implemented in hardware, software, or some combination thereof. For example, at least some of the modules 510-516 can be stored using a memory (not shown) of MPOS 502, and can be executed by a processor (not shown). In one embodiment, control module 516 also implements at least some of the functionality of the business logic module (e.g., of the POS server).

POS server 504, in addition to being configured to send and receive audio content 524, text content 526, text content 532, audio content 534, ID audio content 536, and ID token 538, as described above, is also configured to receive and transmit commands 528 and instructions/indications 530 to and from MPOS device 502. POS server 504 includes business logic module 518 that can determine, for example, a next workflow (or elements of that workflow) to perform, as described herein. POS server 504 can also access an inventory database to determine availability of items, and access finance institutions, such as to finalize a sale and charge customer's credit card.

Business logic module 518 can also generate customer prompts (i.e., suggestions that are provided to the clerk, for use in conversing with the customer), such as described with reference to the workflow of FIG. 11. POS server transmits the customer prompts to MPOS module 502 (which can then be reproduced for the clerk using the audio module). Business logic module 518 can select a promotion prompt for the identified customer and/or item being sold. For example, business logic module can generate a prompt of "Audio cables are on sale" based on the identified customer's previous purchase of a sound system. In one implementation, this prompt is sent (as text 532) to server 506(2) for text-to-audio translation before audio content 534 is transmitted to MPOS device 502. Other customer prompts include general promotions available in the store, such as "DVDs will be on sale later this week", and important moments in the workflow (e.g., "Have a good day"). In one embodiment, business logic module 518 can also generate prompts to provide feedback to the user for verification that the recent command was interpreted correctly, such as "a 25 dollar transaction discount has been applied," or "a 12 dollar hammer has been added."

Business logic module 518 can also identify customers by acquiring and processing customers' spoken voice to identify a customer. Once the customer is identified, that customer's loyalty account can be linked to a transaction that is taking place. This functionality, referred to as voiceprinting, is described with reference to the workflow of FIG. 10. Similarly, voiceprinting can be used to identify seasonal clerks that use a store's MPOS device. In either situation, a clerk or a customer can set up a voice identification phrase, and then speak it to the MPOS device at a later time. By using the voiceprint technique, the impact of seasonal workers sharing logins is reduced, and the hassle of adding customer loyalty links to transactions is eliminated.

POS server 504 also includes language module 520 that can receive text, such as text 526, process this text, and generate commands 528 (as well as alternatives to these commands). The commands (and optionally, the alternatives) are then transmitted (e.g., as commands 528) to MPOS device 502. Language module 520 includes a speech recognition framework. Language module 520 can, for example, use a formal encoded grammar, regular expression scripting, or the like, to parse and interpret phrases from the user (as received in text 526) into commands. In one embodiment, language module 520 can be designed to interpret multiple languages, and thus uses a different formal encoded grammar/expression scripting for each such language.

Language module 520 can be configured to accept variations of phrases, such that the clerk can use natural language instead of having to use precise grammar. Language module 520 can use a multiple option approach to parse and identify words in the received text, and their proximity to each other, in order to deduce the intended command(s). For example, language module 520 can determine that the texts of "add 10% discount," "discount 10%," "10% promo," and "take off 10%" all resolve to the same command that indicates a 10% discount of a certain item. In some cases, language module 520 can generate one or more alternatives if the identification has a low confidence level. Language module 520 can transmit the command with the highest confidence level, as well as several lower scored alternatives, to MPOS module 520. This command is then transmitted to MPOS device 502. In one implementation, the clerk can avail themselves of this flexibility of language module 520, and thus be able to speak commands in shorthand format (e.g., "Price override socks $2.56, incorrect label"), cancel transactions (e.g., by saying "Cancel"), and enter values in input fields (e.g., by saying "Serial number 12345678999").

Control module 516 can, upon acquiring audio using audio module 510 (e.g., from a user such as a clerk and/or a customer), digitize the received audio, and optionally store the digitized audio as an audio file. Control module 516 can then process the voice input (e.g., in the manner described in FIG. 6), including transmitting the digitized audio as audio content 524 to server 506(1). Server 506(1) (such as an audio-to-text module 522(1)) can then process the received audio content and convert the processed audio into text content 526. Text content 526 is then transmitted to POS server 504 and/or MPOS device 502 for further processing (such as parsing the text to determine commands).

MPOS device 502 and/or POS server 504 can send text content 532 to server 506(2). Text content 532 can include prompts that can be used by the store clerk. For example, the prompts can include suggestions (e.g., related and/or alternate products and/or services) that the clerk can provide to the customer, for the customer's consideration. Server 506 (2) converts (such as by using a text-to-audio converter 522(2)) the received text content to audio content 534. Audio content 534 can then be transmitted to MPOS device 502, where audio module 510 can convert the received audio content (i.e., in digital form) to an analog form. In one implementation, control module 516 transmits the received audio content to the clerk's headset (not shown), which can generate audio signals corresponding to the audio content.

To identify a given user by their voice, MPOS device 502 and/or POS server 504 can send ID audio content 536 to server 506(3). ID audio content 536 is typically acquired by MPOS device 502, such as by using audio module 510 (e.g., in a similar fashion to that described with reference to voice input). Server 506(3) (such as using an audio ID module 522(3)) can then process the received audio content (e.g., ID audio content 536) and determine whether the received voiceprint corresponds to a clerk, a customer, or some other party. If a match exists between ID audio content 536 and a certain clerk (or other person), server 506(3) transmits an ID token 538 that identifies the user whose voice has been matched. Otherwise, ID token 538 indicates that no match was found. In one embodiment, audio content 524 corresponding to a clerk can be also used as ID audio content 536 (e.g., to determine a clerk's identity).

Figure 6:
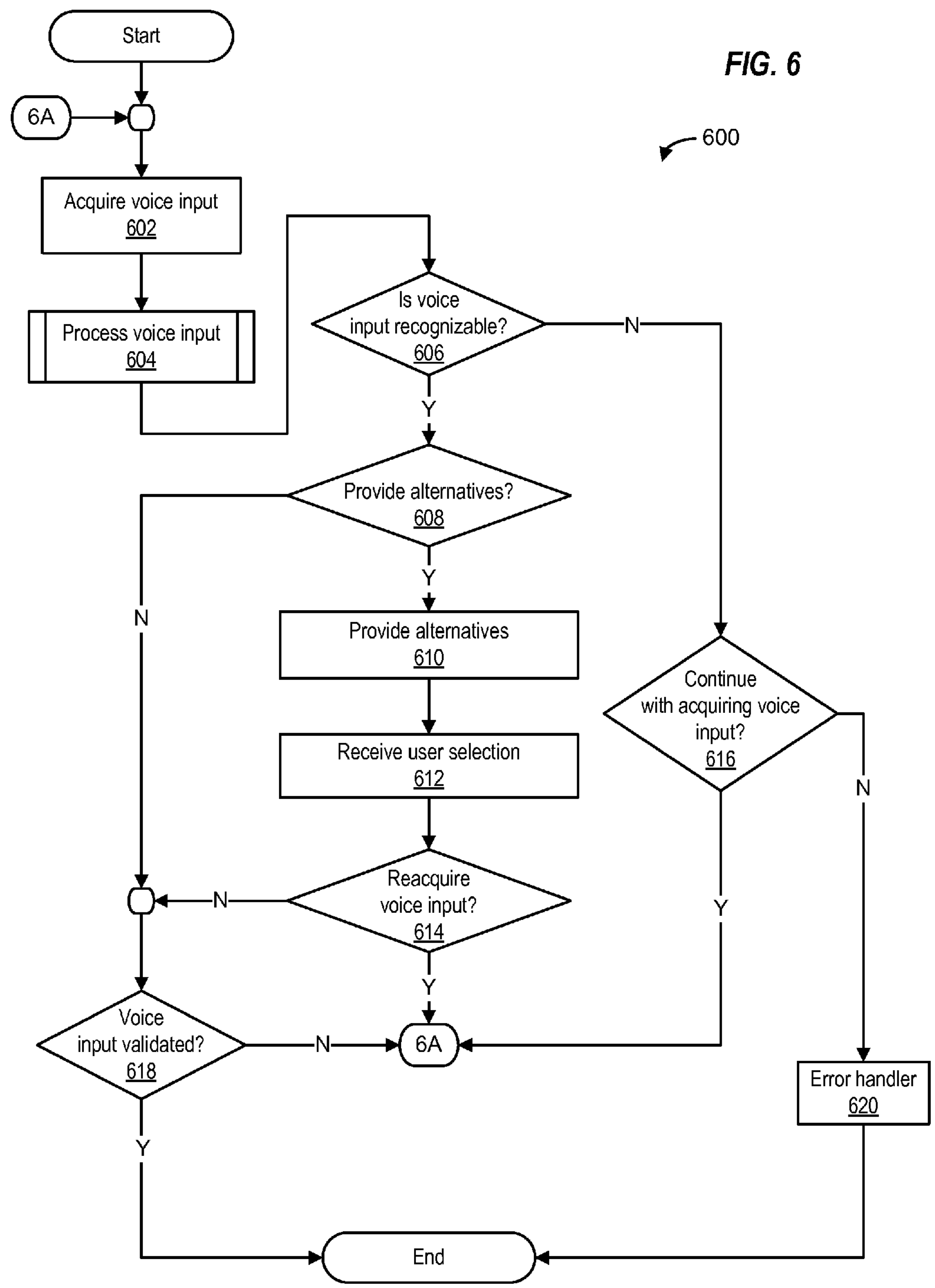
FIG. 6 is a flowchart of a method for receiving voice input, according to one embodiment.

FIG. 6 illustrates a method 600 for processing audio input, according to some embodiments. Method 600 is described with reference to variations of the elements described in connection with FIG. 1. In one embodiment, at least portions of method 600 are executed by a control module of the MPOS device of FIG. 1 or 5. Method 600 implements steps 204 and/or 414 of methods 200 and 400, respectively.

In step 602, the MPOS device acquires a voice input, such as by using an audio module. The MPOS device can be used to acquire voice input of a clerk or a customer.

In step 604, the MPOS device processes the voice input. In one embodiment, the MPOS device's control module can process the voice input by converting the voice input to text, and then parsing the text for one or more commands. In another embodiment, the MPOS device communicates with one or more servers (e.g., server 506(1)) to perform the voice-to-text conversion. The MPOS device, or the POS server (e.g., using the language module) then performs the parsing to identify one or more commands present therein. One implementation of step 604 is described below with reference to FIG. 7. Regardless of implementation, step 604 generates either commands that correspond to the voice input, or, if the commands are not recognizable, an indication that the voice input is not recognizable or otherwise erroneous.

In step 606, the MPOS device determines whether the voice input is recognizable. The MPOS device can make this determination as a result of the invocation of step 604. If the voice input is successfully converted to recognizable commands, then the MPOS device performs step 608. If the voice input is not converted to recognizable commands (or any recognizable text), then the MPOS device performs step 616.

In step 608, the MPOS device determines whether to provide alternatives to the recognizable commands. The MPOS device can make this determination, for example, based on one or more predetermined criteria. The MPOS device can also make this determination based on a level of confidence of the voice-to-text conversion, which can be dynamically generated (e.g., by server 506(1)) for each conversion, as well as on the commands/alternatives generated by the language module. If the MPOS device determines that alternatives should be provided, step 610 is performed, as detailed below. Otherwise, if the MPOS device determines that alternatives need not be provided, step 618 is performed, as detailed below.

In step 610, the MPOS device provides alternatives to the recognizable commands. Step 610 is performed to allow a clerk to validate and/or double-check the voice-to-text conversion performed earlier. In one implementation, the MPOS device displays alternatives to the recognized commands (using the GUI module). In another implementation, the MPOS device provides alternatives to the commands, which can be provided using audio (e.g., using the clerk's headset). In one embodiment, the control module communicates with the business logic module of the POS server to generate these alternatives.

The language module of the POS server can determine the alternatives, such as using natural language algorithms to find commands that make sense in context of any action being performed by the clerk, a workflow that may be already executing, and/or based on other commands. For example, if the voice-to-text generates three commands, and the first and the third command match to a workflow for scanning an item, whereas the second command does not correspond to an expected command for this workflow, the language module can generate an alternative that includes the expected second command. The language module can also generate another alternative that provides different first and third commands, such that the resulting workflow corresponds to a workflow matching one which includes the second command. Other possible scenarios and alternatives will be apparent in light of the present disclosure.

In step 612, the MPOS device receives a user selection of the alternatives to the recognizable commands. With reference to the example above, the MPOS device can receive a selection from the clerk that selects the second command. This selection can be performed in a variety of ways, such as by using voice input and/or manual input (e.g., using a button/display of the MPOS device). It is noted that one of the selections can include reacquisition of at least a portion of the voice input. In step 614, the MPOS device determines whether to reacquire voice input. This determination can be based on the selection received from the user in step 612, for example. If the MPOS device receives input indicating that voice input should be reacquired, step 602 is performed. Otherwise, if reacquisition of voice input is not needed, step 618 is performed.

In step 616, a determination is made as to whether to continue with acquiring voice input. This determination can be based, for example, on an input from the user and/or on some predetermined criteria, such as whether the received text has a very low degree of confidence. If the MPOS device determines that the acquisition of voice input is to continue, step 602 is performed. Otherwise, if the voice input need not be acquired again, step 620 is performed, at which point the MPOS device invokes an error handler.

In step 618, the MPOS device determines whether the voice input is validated. The MPOS device can make this determination, for example, if all of the commands of the converted voice input have a high confidence of matching to commands of a certain workflow. The MPOS device can also make this determination if another user input is received that validates the commands. If the MPOS device determines that the voice input is validated, method 600 ends. Otherwise, if the MPOS device determines that the voice input is not validated, step 602 is performed.

Figure 7:
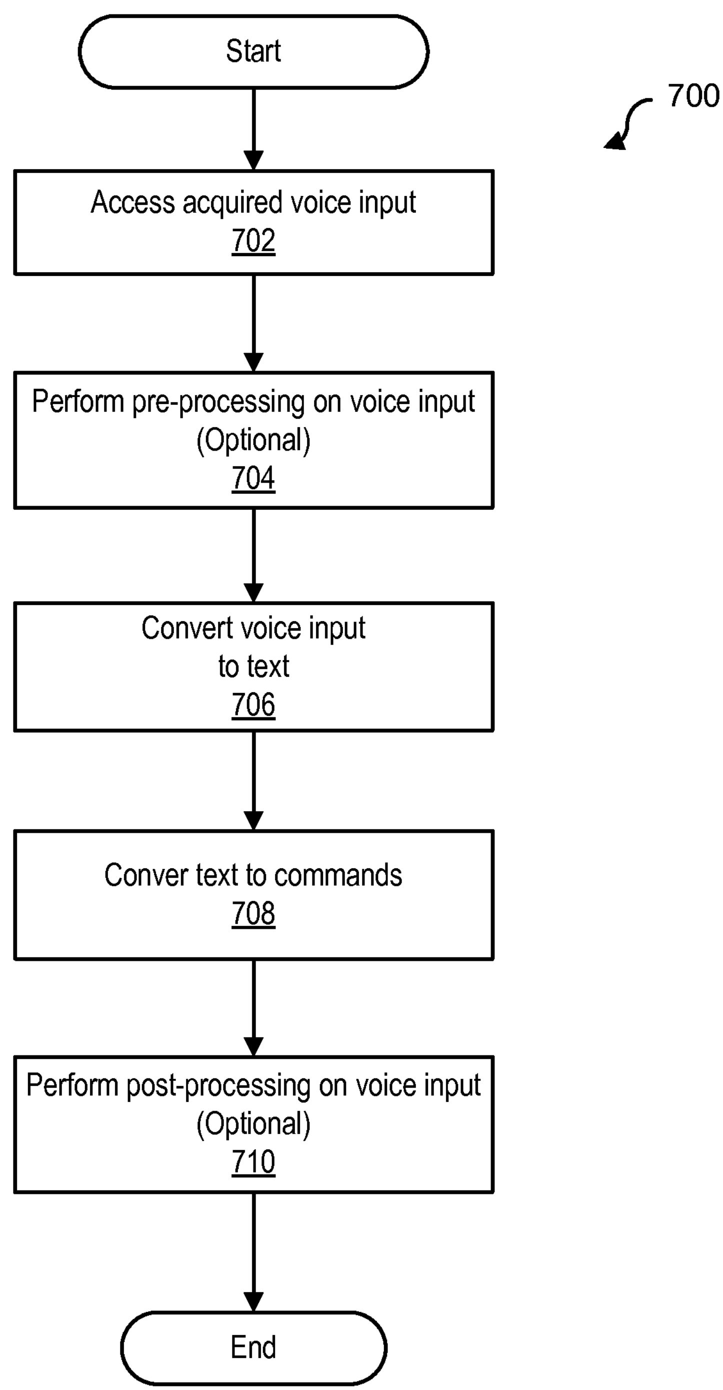
FIG. 7 is a flowchart of a method for processing voice input, according to one embodiment.

FIG. 7 illustrates a method 700 for processing voice input, according to some embodiments. Method 700 is described with reference to variations of the elements described in connection with FIG. 1. In one embodiment, at least portions of method 700 are executed by a control module of the MPOS device of FIG. 1 or 5. Method 700 implements step 604 of method 600.

In step 702, the MPOS device acquires a voice input, such as by using an audio module. The MPOS device can be used to acquire voice input of a clerk or other user (e.g., a customer). As described above, the MPOS device can digitize and store the acquired audio.

In step 704, the MPOS device pre-processes the voice input. This pre-processing can include performing one or more signal processing functions, such as filtering, to remove noise from the acquired voice input. Step 704 is optional, depending on the implementation of the MPOS device. Alternatively, one of the servers, (e.g., server 506(2)) can perform such functions instead, or the pre-processing may not be performed at all.

In step 706, the MPOS device converts the voice input to text. In one embodiment, the MPOS device transmits captured audio (such as via a network) to a voice-to-text conversion module (such as can be implemented using server 506(2)). Once the voice-to-text converted module performs the conversion, the MPOS device (and/or the POS server) receives the converted text. In another embodiment, the MPOS device performs this conversion itself (such as by using a control module (e.g., control module 110 of FIG. 1)).

In step 708, the MPOS device converts the text to one or more commands. In one embodiment, the MPOS device transmits the text (such as via a network) to the POS server (e.g., to the language module) for conversion, and then receives back the command(s) (and, as applicable, alternative(s)). In another embodiment, the MPOS device performs this conversion itself (via its control module). In either implementation, the command(s) can have an associated confidence score, which is a number that indicates the projected accuracy of the conversion performed.

In step 710, the MPOS device post-processes the commands. The post-processing can include determining which alternatives to provide to the clerk.

It is noted that FIGS. 8-11, described below, illustrate various workflows of a POS system, the operative of which can be performed by the POS server and/or the MPOS device. As described above, in some embodiments, the MPOS device can perform each such workflow using manual controls (e.g., such as by interacting with a display of the MPOS device) or by using voice input. In one embodiment, the MPOS device is configured to allow the user to input selections and/or other information using a combination of manual controls and voice input. When using voice input, the MPOS device can determine, for example, which element(s) of the selected workflow can be skipped. In such scenario, the MPOS device can skip elements 902-910 of the workflow of FIG. 9, based on the received voice input. Instead, after processing the voice input, the MPOS device can resume performance of the workflow of FIG. 9 at step 912. However, during processing of the voice input, the MPOS device can instead determine workflow performance should be resumed at step 906 instead.

As will be appreciated in light of the present disclosure, these workflows may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in another embodiment(s).

Figure 8:
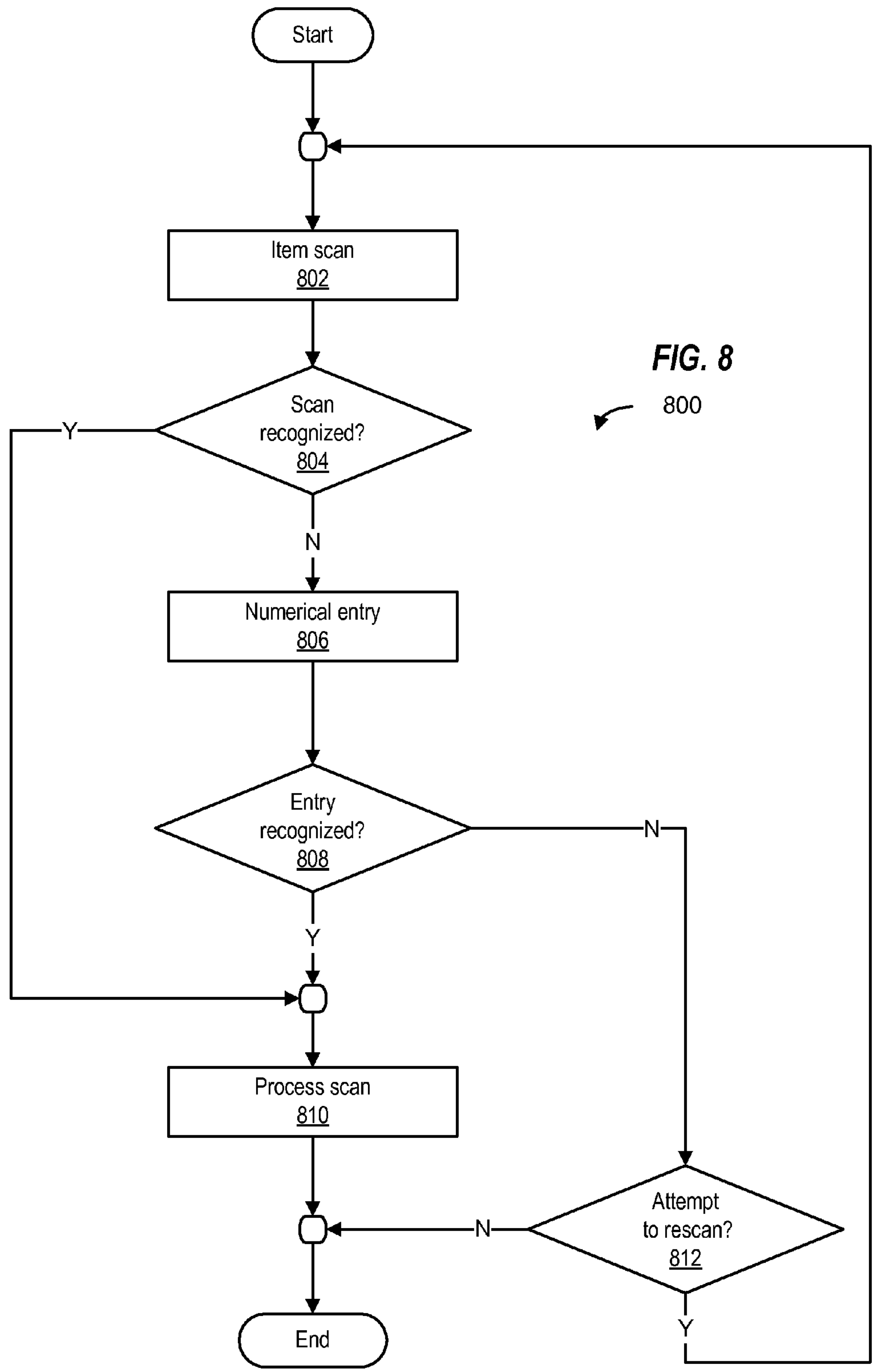
FIG. 8 is a flowchart of a workflow for numerical entry, according to one embodiment.

FIG. 8 illustrates a workflow 800 for performing an item scan using a mobile POS device, according to some embodiments. Workflow 800 is described with reference to variations of the elements described in connection with FIG. 1. In one embodiment, at least portions of workflow 800 are performed by the MPOS device of FIG. 1, such as by control module 110 of MPOS device 102.

In element 802, the MPOS device scans an item. For example, a clerk can use the MPOS device to scan an item (e.g., an item's bar) using Infrared (IR), as Radio Frequency Identification (RFID) tag or Near Field Communication (NFC) using wireless scanning, and/or any other comparable identification technique.

In element 804, the MPOS device determines whether the scan is recognized (such as does it register with an item database that can be implemented using the POS server). If the scan is recognized, the MPOS device proceeds to element 810. If the scan is not recognized, the MPOS device proceeds to element 806.

In element 806, the MPOS device receives a numerical entry. For example, the MPOS device can receive a manual entry using the MPOS device's touch screen and/or a keyboard. In element 808, the MPOS device determines whether the numerical entry is recognized (such as does it register with an item database that can be implemented using the POS server). If the entry is recognized, the MPOS device proceeds to element 810. If the scan is not recognized, the MPOS device proceeds to element 812.

In element 810, the MPOS device processes the item scan. For example, the MPOS device can communicate with the POS server such as to perform a checkout workflow and/or an item prompt workflow. In element 812, the MPOS device determines whether to attempt to rescan the item. If the MPOS device determines to rescan, the MPOS device proceeds to element 802. If the MPOS device determines not to rescan the item, the process of workflow 800 concludes.

Figure 9:
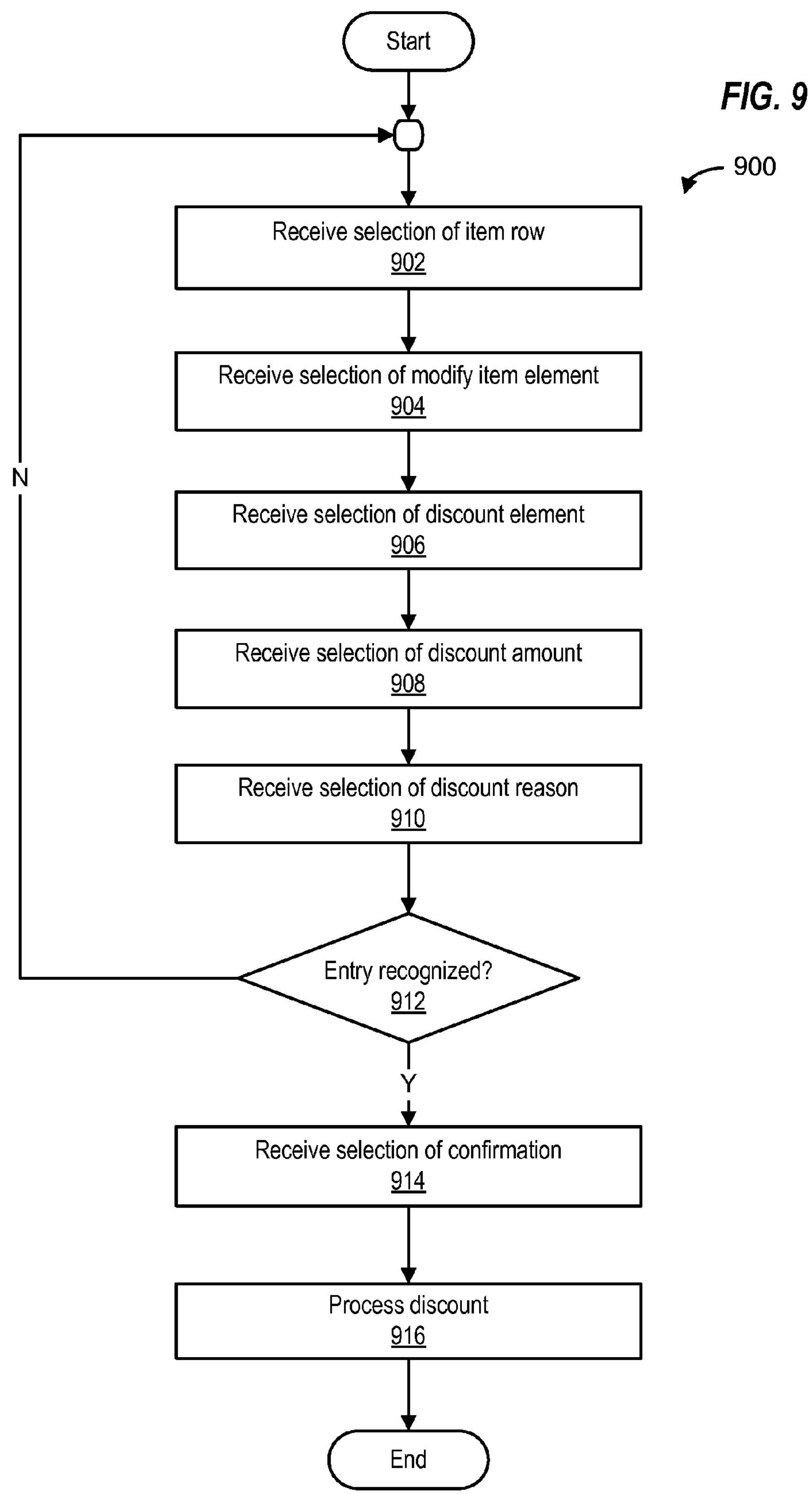
FIG. 9 is a flowchart of a workflow for discount entry, according to one embodiment.

FIG. 9 illustrates a workflow 900 for receiving a discount entry using a mobile POS device, according to some embodiments. Workflow 900 is described with reference to variations of the elements described in connection with FIG. 1. In one embodiment, at least portions of workflow 900 are performed by the MPOS device of FIG. 1, such as by control module 110 of MPOS device 102. It is noted that the MPOS device can display various elements using its display, and can also receive user input using a button/touch screen/keyboard of the MPOS device.

In element 902, the MPOS device receives a selection of an item row on a basket page. In element 904, the MPOS device receives a selection of a modify item button from a toolbar (that can also be displayed using the MPOS device). In element 906, the MPOS device receives a selection of a discount element button on a navigation page. In element 908, the MPOS device receives a numeric entry of a percentage discount on a discount page. In element 910, the MPOS device receives a reason for the discount, such as by using a drop-down menu on the discount page.

In element 912, the MPOS device determines whether the previous entries have been recognized. For example, the MPOS device can communicate with the POS server to determine whether the item can be discounted, whether the amount and/or the reason is appropriate, and so on. If the MPOS device determines that the entries are recognized, the MPOS device proceeds to element 916. If the MPOS device determines that the entries are not recognized, the MPOS device proceeds to element 902.

FIG. 10 illustrates a workflow 1000 for performing customer identification using a mobile POS device, according to certain embodiments. However, workflow 1000 can also be performed to identify a clerk or another person. Workflow 1000 is described with reference to variations of the elements described in connection with FIG. 1. In one embodiment, at least portions of workflow 1000 are performed by the MPOS device, such as by control module 110 of MPOS device 102 of FIG. 1.

It is noted that with reference to this workflow, the control module can use voiceprint functionality. An MPOS device with the voiceprint functionality can receive and process customer's voice to find that customer's ID, as further described below. In other words, instead of receiving manual input to perform elements 1002-1016, the MPOS device can receive a customer's voiceprint phrase. The MPOS device can provide a prompt to the clerk, such as to ask a customer for the customer's voiceprint phrase (i.e., a voice identification phrase). The MPOS device then identifies the customer account (such as by communicating with ID server 506(3)) to obtain a customer ID that corresponds to the acquired customer's voiceprint phrase.

In element 1002, the MPOS device receives selection of a submenu. In element 1004, the MPOS device receives a selection of customer ID element. In element 1006, the MPOS device receives customer ID information. In element 1008, the MPOS device searches for customer ID. In one implementation, the MPOS device can communicate with the POS server and/or another server to perform this search. In element 1010, the MPOS device determines the existence of a match for the customer ID (such as does it register with the customer database that can be implemented using the POS server/other server(s)). If the customer ID is recognized, the MPOS device proceeds to element 1014. If the customer is not recognized, the MPOS device proceeds to element 1012. In element 1012, the MPOS device determines whether to continue with the workflow. This determination can be based on a selection received from the user. If the determination indicates that the workflow is to continue, the MPOS device proceeds to element 1002. Otherwise, if the determination indicates that the workflow is not to be continued, the workflow concludes.

In element 1016, the MPOS device receives a verification of a customer ID. In element 1018, the MPOS device determines a whether to link the customer ID with a transaction (which can be associated with another workflow that is executing). If the MPOS device determines to link the customer ID with the transaction, the MPOS device proceeds to element 1020. If the MPOS device determines not to link the customer ID with the transaction, the workflow 1000 concludes.

Figure 11:
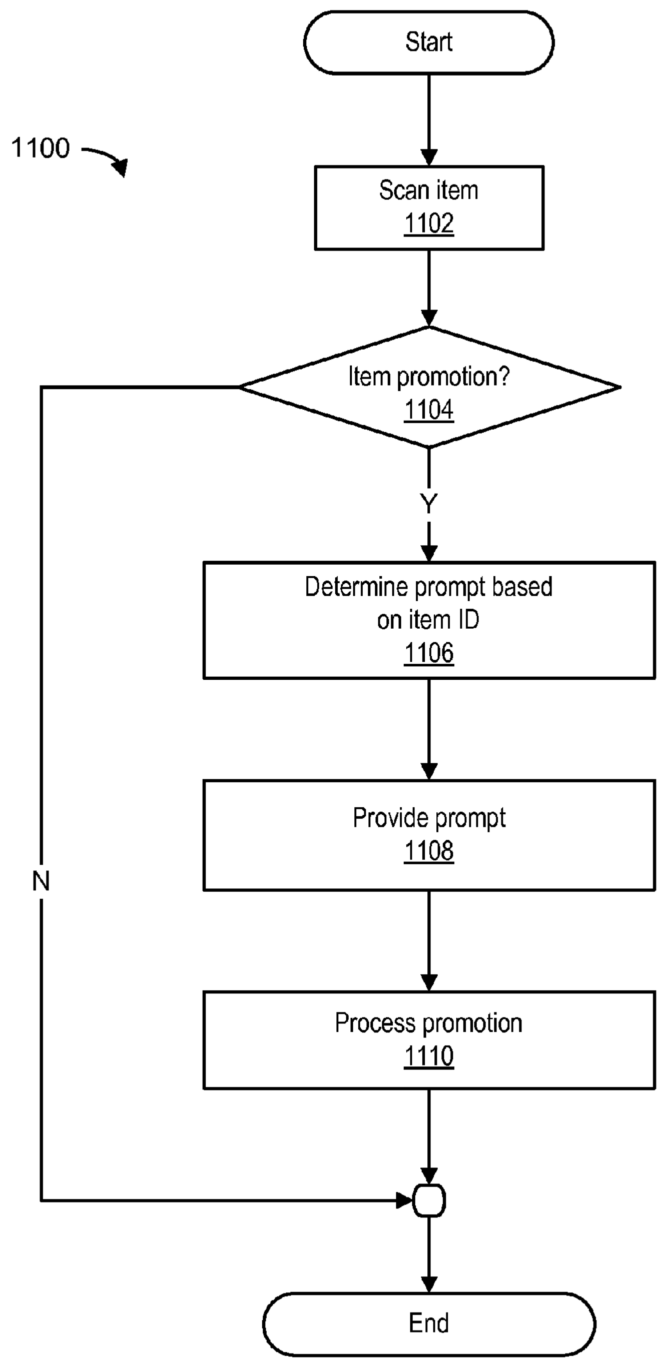
FIG. 11 is a flowchart of a workflow for providing customer prompts, according to one embodiment.

FIG. 11 illustrates a workflow 1100 for generating a clerk script for a clerk using a mobile POS device, according to certain embodiments. Workflow 1100 is described with reference to variations of the elements described in connection with FIG. 1. In one embodiment, at least portions of workflow 1100 are performed by the MPOS device of FIG. 1, such as by control module 110 of MPOS device 102. It is noted that the MPOS device can display various elements using its display, and can also receive user's manual input using a button/touch screen/keyboard of the MPOS device.

In element 1102, the item is scanned using the MPOS device. For example, a clerk can use the MPOS device to scan an item (e.g., an item's bar code) using Infrared (IR), or can use Radio Frequency Identification (RFID), Near Field Communication (NFC), and/or any other comparable identification technique.

In element 1104, the MPOS device determines whether the scanned item has a promotion. If the determination indicates that the item has a promotion, the MPOS device proceeds to element 1106. If the determination indicates that the item does not have a promotion, the workflow concludes. In element 1106, the MPOS device determines a prompt based on the item ID. Furthermore, if the customer ID is available (such as based on a recognized customer voice), the MPOS device can determine a prompt that is customized for that customer. In element 1108, the MPOS device provides the prompt for the clerk to use. These prompts (which can be converted to audio using text-to-voice conversion), can provide the clerk with prompts such as customer relationship script details (e.g., "tools are 15% off this week for registered carpenters like yourself"). In element 1110, the MPOS device processes the promotion.

For example, if a clerk scans in an item using the MPOS device, the MPOS device can communicate with the POS server to determine whether this item has a promotion. It is noted that the workflow of FIG. 8 can be performed first if the item scan is not recognized. Furthermore, the workflow of FIG. 10 can also be performed prior to the workflow of FIG. 11 to identify the customer. The MPOS device then communicates with the POS server (e.g., with the business logic module) to determine if there are promotions customized for this item, and for the customer (if applicable). The MPOS device then provides the appropriate prompt to the clerk.

Example MPOS Device and Server Architectures

Figure 12:
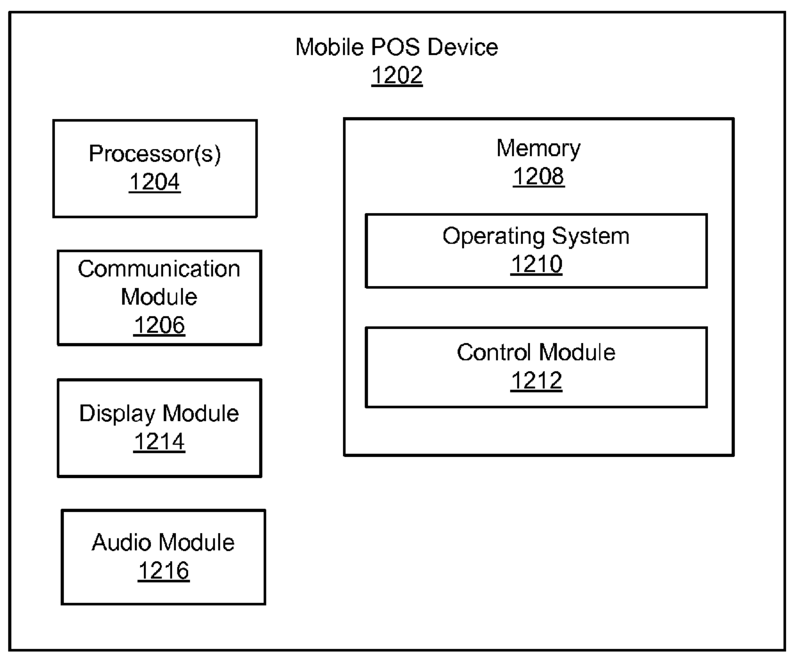
FIG. 12 is a block diagram illustrating relevant components of an example MPOS device in which the present disclosure can be implemented, according to one embodiment.

FIG. 12 is a block diagram 1200 of a mobile POS device 1202, such as mobile POS device 102 and/or MPOS device 502. MPOS device 1202 includes one or more processor(s) 1204, a communication module 1206, a memory 1208, a display module 1214, and an audio module 1216. It is noted that is some embodiments, one or more of these elements may be combined. Memory 1208 includes operating system 1210 and control module 1212. Control module 1212 can be an implementation of control module 110. It is also noted that portions of control module 1212 may be implemented as a software and/or hardware module. It is also noted that in some embodiments one or more of elements of MPOS 1202 may not be used. Communication module 1206 can facilitate communication of MPOS module 1202 with the other servers. Processor(s) 1204 can execute one or more of control module 1212 and/or operating system 1210. Control module 1212 can implement at least portions of methods of FIGS. 2-4, 6, 7, and workflows of FIGS. 8-11.

Figure 13:
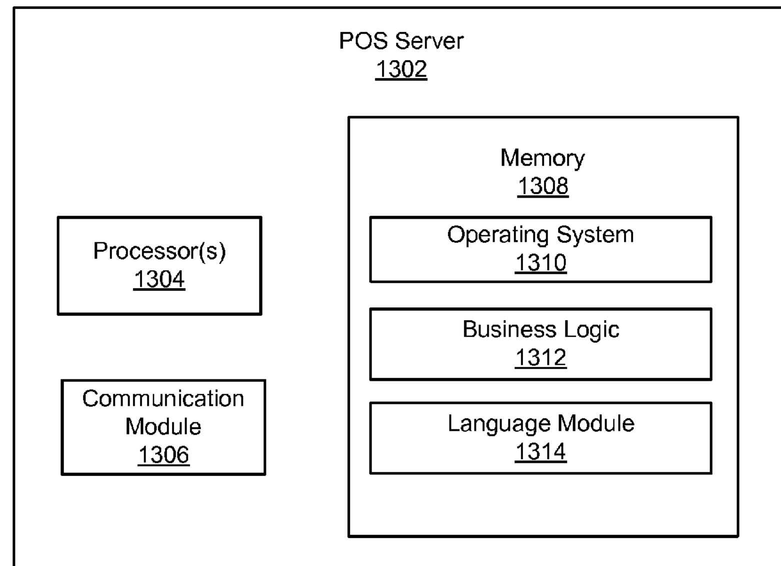
FIG. 13 is a block diagram illustrating relevant components of an example POS server in which the present disclosure can be implemented, according to one embodiment.

FIG. 13 is a block diagram 1300 of a POS server 1302, such as POS server 116. POS server 1302 includes one or more processor(s) 1304, a communication module 1306, and memory 1308. It is noted that is some embodiments, one or more of these elements may be combined. Memory 1308 includes operating system 1310, business logic module 1312, and a language module 1314. Business logic module 1312 can be an implementation of business logic module 518, and language module 1314 can implement language module 520. It is also noted that portions of business logic module 1212 may be implemented as a software and/or hardware module. It is also noted that in some embodiments one or more of elements of POS server 1302 may not be used. Communication module 1306 can facilitate communication of POS server 1302 with other devices and/or servers. Processor(s) 1304 can execute one or more of control module 1312 and/or operating system 1310. Business logic module 1312 can implement at least portions of methods of FIGS. 2-4, 6, 7, and workflows of FIGS. 8-11.

Example Computing System

Figure 14:
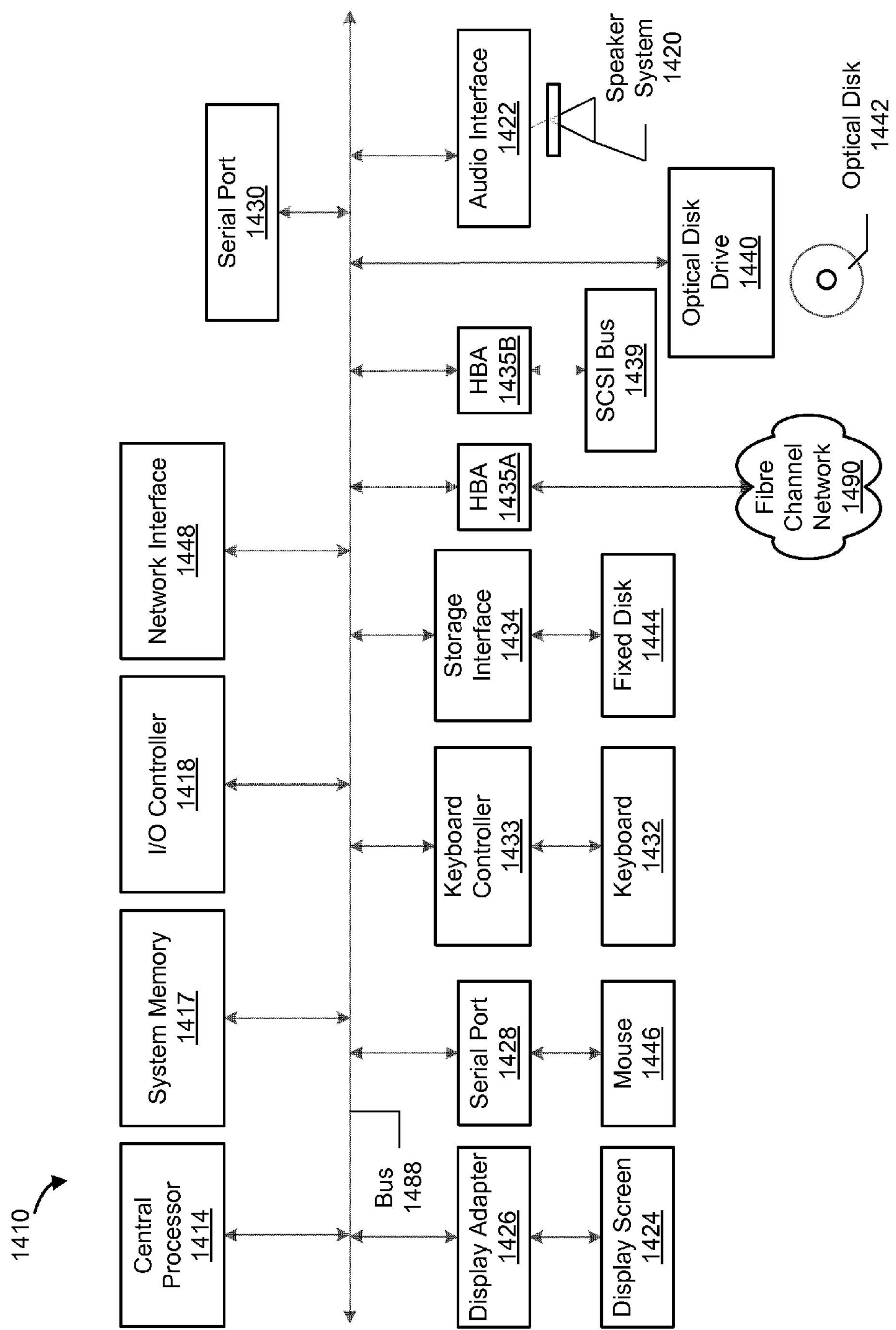
FIG. 14 is a block diagram that illustrates an example of a computer system suitable for implementing embodiments of the present application.

FIG. 14 depicts a block diagram of a computer system 1410 suitable for implementing the present disclosure. Computer system 1410 may be illustrative of various computer systems in the networked system of FIG. 1, such as node(s) and/or storage node(s), among others. Computer system 1410 includes a bus 1488 which interconnects major subsystems of computer system 1410, such as a central processor 1414, a system memory 1417 (typically RAM, but which may also include ROM, flash RAM, or the like), an input/output controller 1418, an external audio device, such as a speaker system 1420 via an audio output interface 1422, an external device, such as a display screen 1424 via display adapter 1426, serial ports 1428 and 1430, a keyboard 1432 (interfaced with a keyboard controller 1433), a storage interface 1434, a host bus adapter (HBA) interface card 1435A operative to connect with a Fibre Channel network 1490 (and/or Ethernet), a host bus adapter (HBA) interface card 1435B operative to connect to a SCSI bus 1439, and an optical disk drive 1440 (e.g., a CD drive, a DVD drive, a BLUE-RAY drive, among others) a operative to receive an optical disk 1442. Also included are a mouse 1446 (or other point-and-click device, coupled to bus 1488 via serial port 1428), and a network interface 1448, such as Ethernet (coupled directly to bus 1488). It is noted that one or more of serial ports 1428/1430 can be implemented using USB, IEEE 13144, THUNDERBOLT, SATA, and/or other high-speed serial bus(es).

Bus 1488 allows data communication between central processor 1414 and system memory 1417, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1410 are generally stored on and accessed via a computer readable medium, such as a hard disk drive (e.g., fixed disk 1444), an optical drive (e.g., optical drive 1440), a USB flash drive, or other storage medium. Additionally, applications can be in the form of electronic signals modulated in accordance with the application and data communication technology when accessed via serial port 1430 or interface 1448.

Storage interface 1434, as with the other storage interfaces of computer system 1410, can connect to a standard computer readable medium for storage and/or retrieval of information, such as a fixed disk drive 1444. Fixed disk drive 1444 may be a part of computer system 1410 or may be separate and accessed through other interface systems. Network interface 1448 may provide a direct connection to a remote server, such as via a direct network link to the Internet. Network interface 1448 may provide such connection using wired and/or wireless techniques, including various types of digital cellular telephone connections (e.g., 1G, 2G, 2.5G, 3G, 3.5G, 4G, 5G, etc.), digital satellite data connection, WiFi, WiMAX, and/or the like.

Many other devices or subsystems (not shown) may be connected in a similar manner (e.g., document scanners, digital cameras and so on). Conversely, all of the devices shown in FIG. 14 need not be present to practice the present disclosure. The devices and subsystems can be interconnected in different ways from that shown in FIG. 14. The operation of a computer system such as that shown in FIG. 14 is readily known in the art and is not discussed in detail in this application. Code for control module (such as described above with reference to the methods of FIGS. 2-4, 6, 7, and the workflows of FIGS. 8-11), etc., to implement the present disclosure can be stored in computer-readable storage media such as one or more of system memory 1417, fixed disk 1444, optical disk 1442, or another data storage device, such as a USB flash drive, among others. Memory 1417 is also used for storing temporary variables or other intermediate information during the execution of instructions by the processor 1414. The operating system provided on computer system 1410 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method performed by a mobile Point-of-Sale device that includes at least one processor, the method comprising:

in response to receiving an electronic audio input to control processing of a transaction, digitizing, in the mobile Point-of-Sale (MPOS) device, the electronic audio input to convert the electronic audio input into digital audio that represents speech of a user embodied within the electronic audio input;

converting, by the processor, the digital audio into digital text, and parsing the digital text to identify one or more phrases and one or more values;

determining, by the processor, if the one or more phrases correspond to at least one command from a plurality of commands;

if the one or more phrases do not correspond to at least one command, then generating an indication on the mobile Point-of-Sale device that the electronic audio input is not recognized;

if the one or more phrases are determined to correspond to at least one command, then:

(i) generating, by the processor, the at least one command that corresponds to the one or more phrases identified;

(ii) selecting, by the processor, one or more workflow steps, from a plurality of stored workflow steps, that correspond to the at least one command;

(iii) executing, by the processor, the one or more workflow steps to perform at least automatic input of entry fields in screen menus on the mobile Point-of-Sale device using the one or more values from the digital text of the digital audio, wherein the executing causes to the processor to bypass one or more manual prompts in a series of prompts within the one or more workflow steps.

2. The computer-implemented method of claim 1, wherein converting includes automatically identifying at least one alternative command in a series of commands that include the at least one command by interpolating the at least one alternative command according to at least the separate words of the digital text that satisfy a confidence interval.

3. The computer-implemented method of claim 1, wherein the at least one command automates selecting electronic inputs to the one or more workflow steps that are executed to automate processing of at least a portion of the transaction by modifying electronic data structures of the transaction according to the workflow steps and the electronic inputs to avoid manual entry of values for the portion of the transaction.

4. The computer-implemented method of claim 1, wherein executing the one or more workflow steps comprises generating a set of graphical user interfaces (GUIs) that include embedded electronic commands for serializing input for portions of the transaction by displaying the set of GUIs in a defined order to control when elements of an electronic data structure of the transaction are modified.

5. The computer-implemented method of claim 1, wherein the at least one command identified from the electronic audio input automates at least a portion of the workflow steps for the transaction by controlling a point-of-sale device to perform the portion of the workflow without receiving manual electronic inputs from a user.

6. The computer-implemented method of claim 1, wherein the executing includes selecting a secondary workflow according to a context of the one or more workflow steps and the at least one command to cause further modifications of the transaction.

7. The computer-implemented method of claim 1, wherein converting includes validating that the at least one command is valid by determining whether bypassing the one or more manual prompts of the workflow according to the command is permitted.

8. A computing system, comprising:

one or more processors;

a memory connected with the one or processors, wherein the memory stores:

an audio module including instructions that when executed by the one or more processors cause the computing system to perform at least:

in response to receiving an electronic audio input to control processing of a transaction, digitizing, in a mobile Point-of-Sale (MPOS) device, the electronic audio input to convert the electronic audio input into digital audio that represents speech of a user embodied within the electronic audio input, a control module including instructions that when executed by the one or more processors cause the computing system to perform at least:

converting, by the processor, the digital audio into digital text, and parsing the digital text to identify one or more phrases and one or more values;

determining, by the processor, if the one or more phrases correspond to at least one command from a plurality of commands;

if the one or more phrases do not correspond to at least one command, then generating an indication on the mobile Point-of-Sale device that the electronic audio input is not recognized;

if the one or more phrases are determined to correspond to at least one command, then:

(i) generating, by the processor, the at least one command that corresponds to the one or more phrases identified;

(ii) selecting, by the processor, one or more workflow steps, from a plurality of stored workflow steps, that correspond to the at least one command;

(iii) executing, by the processor, the one or more workflow steps to perform at least automatic input of entry fields in screen menus on the mobile Point-of-Sale device using the one or more values from the digital text of the digital audio, wherein the executing causes to the processor to bypass one or more manual prompts in a series of prompts within the one or more workflow steps.

9. The system of claim 8, wherein the control module includes instructions to perform converting that include instructions for automatically identifying at least one alternative command in a series of commands that include the at least one command by interpolating the at least one alternative command according to at least the separate words of the digital text that satisfy a confidence interval.

10. The system of claim 8, wherein the control module uses the at least one command to automate selecting electronic inputs to the one or more workflow steps that are executed to automate processing of at least a portion of the transaction by modifying electronic data structures of the transaction according to the workflow steps and the electronic inputs to avoid manual entry of values for the portion of the transaction.

11. The system of claim 8, wherein the control module includes instructions for executing the one or more workflow steps including instructions for generating a set of graphical user interfaces (GUIs) that include embedded electronic commands for serializing input for portions of the transaction by displaying the set of GUIs in a defined order to control when elements of an electronic data structure of the transaction are modified.

12. The system of claim 8, wherein the control module includes instructions that use the at least one command identified from the electronic audio input to automate at least a portion of the workflow steps for the transaction by controlling point-of-sale device to perform the portion of the workflow without receiving manual electronic inputs from a user.

13. The system of claim 8, wherein the control module includes instructions that when executed cause the processor to select a secondary workflow according to a context of the one or more workflow steps and the at least one command to cause further modifications of the transaction.

14. The system of claim 8, wherein the control module includes instructions that when executed cause the processor to perform the converting by validating that the at least one command is valid by determining whether bypassing the one or more manual prompts of the workflow according to the command is permitted.

15. A non-transitory computer-readable medium storing instructions that when executed by one or more processors cause the one or more processors of a computing device to perform at least:

in response to receiving an electronic audio input to control processing of a transaction, digitizing, in a mobile Point-of-Sale (MPOS) device, the electronic audio input to convert the electronic audio input into digital audio that represents speech of a user embodied within the electronic audio input;

converting, by the processor, the digital audio into digital text, and parsing the digital text to identify one or more phrases and one or more values;

determining, by the processor, if the one or more phrases correspond to at least one command from a plurality of commands;

if the one or more phrases do not correspond to at least one command, then generating an indication on the mobile Point-of-Sale device that the electronic audio input is not recognized;

if the one or more phrases are determined to correspond to at least one command, then:

(i) generating, by the processor, the at least one command that corresponds to the one or more phrases identified;

(ii) selecting, by the processor, one or more workflow steps, from a plurality of stored workflow steps, that correspond to the at least one command;

(iii) executing, by the processor, the one or more workflow steps to perform at least automatic input of entry fields in screen menus on the mobile Point-of-Sale device using the one or more values from the digital text of the digital audio, wherein the executing causes to the processor to bypass one or more manual prompts in a series of prompts within the one or more workflow steps.

16. The non-transitory computer-readable medium of claim 15, wherein the instructions for converting includes instructions for automatically identifying at least one alternative command in a series of commands that include the at least one command by interpolating the at least one alternative command according to at least the separate words of the digital text that satisfy a confidence interval.

17. The non-transitory computer-readable medium of claim 15, wherein the at least one command automates selecting electronic inputs to the one or more workflow steps that are executed to automate processing of at least a portion of the transaction by modifying electronic data structures of the transaction according to the workflow steps and the electronic inputs to avoid manual entry of values for the portion of the transaction.

18. The non-transitory computer-readable medium of claim 15, wherein the instructions for executing the one or more workflow steps comprise instructions for generating a set of graphical user interfaces (GUIs) that include embedded electronic commands for serializing input for portions of the transaction by displaying the set of GUIs in a defined order to control when elements of an electronic data structure of the transaction are modified.

19. The non-transitory computer-readable medium of claim 15, wherein the at least one command identified from the electronic audio input automates at least a portion of the workflow steps for the transaction by controlling a point-of-sale device to perform the portion of the workflow steps without receiving manual electronic inputs from a user.

20. The non-transitory computer-readable medium of claim 15, wherein the instructions for executing includes instructions for selecting a secondary workflow according to a context and the at least one command to cause further modifications of the transaction, and wherein converting includes validating that the at least one command is valid by determining whether bypassing the one or more manual prompts of the workflow steps according to the command is permitted.

* * * * *